(No Model.)

A. J. HAVILAND.
SCREW FOR FASTENING TELEGRAPH WIRES.

No. 258,061. Patented May 16, 1882.

Attest:
F. W. Howard
Jno. R. Young

Inventor:
Andrew J. Haviland
by W. H. Doolittle
Attorney

UNITED STATES PATENT OFFICE.

ANDREW J. HAVILAND, OF FORT DODGE, IOWA.

SCREW FOR FASTENING TELEGRAPH-WIRES.

SPECIFICATION forming part of Letters Patent No. 258,061, dated May 16, 1882.

Application filed March 2, 1882. (No model.)

*To all whom it may concern:*

Be it known that I, ANDREW J. HAVILAND, a citizen of the United States, residing at Fort Dodge, in the county of Webster and State of Iowa, have invented certain new and useful Improvements in Wire and Rope Fasteners; and I do hereby declare the following to be a full, clear, and exact description of the invention, such as will enable others skilled in the art to which it appertains to make and use the same.

The object of my invention is the construction of a fastening device for securely holding in place wire used for fencing, telegraph, telephone, and other purposes, or for holding clothes' lines and cords or ropes in place when carried from point to point.

Figure 1:
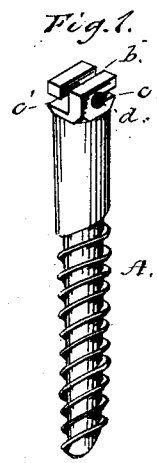
Figure 2:
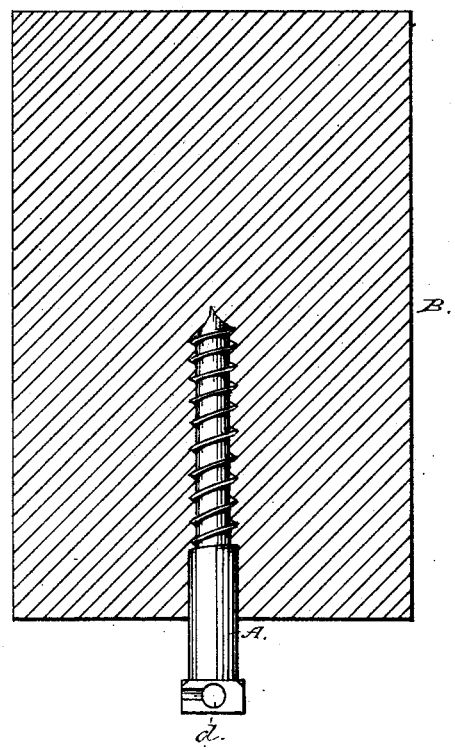

It consists partly of a screw the head of which is slit in the manner illustrated in the accompanying drawings, in which Figure 1 is a perspective view, and Fig. 2 an illustration of the device applied to a common form of telegraph-insulator or other object.

A is the body of the fastening device, which is provided with usual form of screw-threads and gimlet-point.

The head of the fastener is provided with a transverse central slit, $b$, to which is connected, at right angles therewith, side slits, $c$ and $c'$, which extend into the center of slit $b$ from opposite sides of the head, and there terminate in a circle forming a hole running entirely through the head, as shown at $d$, Fig. 2.

B represents an object to which the fastener may be secured. It may be secured to a glass insulator of any form, the insulator being first formed with a female screw to receive the same. The fastener and slits may be made of any size to accommodate any size of wire or cord, and screwed into the top or sides of posts or other supports.

The wire, rope, or cord may be applied to the fastener either by first passing it, say, into slot C, then through the central channel or slit, $b$, and then into slit $c'$, or the wire may be laid into the central slit, $b$, and the fastener then, by means of a wrench, turned half-way round. In either case the wire will be securely held in place, yet loosely held, so as to freely permit of contraction and expansion.

The wire or cord can be tightened when it becomes slack by simply giving the fastener an additional twist, thus obviating the necessity of taking the wire out of the holder, or removing the holder for that purpose, as is the case of staples and other form of fasteners in common use.

The employment of my form of fastener or holder is particularly useful on live posts, as when the post grows and presses the wire too closely the fastener can be screwed out so as to keep the wire in proper position without removing the wire from the holder.

The fastener may be made of any material of sufficient strength and durability; and for telegraph and telephone purposes the head of the same may be made of glass of the same shape, with slits, &c., as those of metal for other purposes. The head of the screw might also be provided with arms, around which the glass might be blown, said arms being of such size and strength as to enable the fastener to be screwed into any kind of wood.

Having thus described my invention, what I claim, and desire to secure by Letters Patent, is—

A wire, rope, or cord fastener or holder consisting of a screw body, and a head provided with the slits $b$, $c$, and $c'$, substantially as described.

In testimony whereof I affix my signature in presence of two witnesses.

ANDREW J. HAVILAND.

Witnesses:
ELMER E. HAVILAND,
GEO. B. SHERMAN.